US008708168B2

(12) United States Patent
Lin

(10) Patent No.: US 8,708,168 B2
(45) Date of Patent: Apr. 29, 2014

(54) TOOL STAND

(75) Inventor: Da-Sen Lin, Taichung (TW)

(73) Assignee: Pard Hardware Industrial Co., Ltd., Taichung (TW)

( * ) Notice: Subject to any disclaimer, the term of this patent is extended or adjusted under 35 U.S.C. 154(b) by 25 days.

(21) Appl. No.: 13/288,004

(22) Filed: Nov. 2, 2011

(65) Prior Publication Data

US 2013/0105424 A1 May 2, 2013

(51) Int. Cl.
*A47F 3/10* (2006.01)
*B62B 3/12* (2006.01)

(52) U.S. Cl.
USPC ..................... 211/131.1; 280/47.35; 312/125; 108/94

(58) Field of Classification Search
USPC .......... 211/70, 70.6, 77, 78, 95, 131.1, 133.4, 211/144, 163, 205; 312/109, 125, 135, 216, 312/305; 108/94, 95, 139, 141; 280/47.34, 280/47.35, 79.3
See application file for complete search history.

(56) References Cited

U.S. PATENT DOCUMENTS

| | | | | | |
|---|---|---|---|---|---|
| 111,608 | A | * | 2/1871 | Castelow | 108/94 |
| 405,003 | A | * | 6/1889 | Blackledge | 312/123 |
| 488,594 | A | * | 12/1892 | Yost | 108/103 |
| 2,677,587 | A | * | 5/1954 | Waldo, Sr. | 312/249.8 |
| 3,543,699 | A | * | 12/1970 | Leikarts | 108/59 |
| 3,782,296 | A | * | 1/1974 | Moretini | 108/101 |
| 4,099,634 | A | * | 7/1978 | McIntire et al. | 414/560 |
| 4,118,048 | A | * | 10/1978 | Spranger et al. | 280/47.35 |
| 4,258,962 | A | * | 3/1981 | Slaugh | 312/125 |
| 5,842,425 | A | * | 12/1998 | van der Aa | 108/64 |
| 5,971,512 | A | * | 10/1999 | Swan | 312/281 |
| 6,073,942 | A | * | 6/2000 | Heneveld, Sr. | 280/33.991 |
| 6,705,655 | B2 | * | 3/2004 | Yang | 294/161 |
| 6,951,374 | B2 | * | 10/2005 | Swenson | 312/285 |

FOREIGN PATENT DOCUMENTS

JP 05192231 A * 8/1993 ............. A47B 61/00

* cited by examiner

*Primary Examiner* — Joshua Rodden

(57) ABSTRACT

A tool stand includes a base, a post rotationally supported on the base, at least two trays rotationally supported on the post above the base, small wheels connected to the base, and large wheels connected to the lowermost one of trays so that the large wheels do not interfere with the rotation of the base relative to the post.

6 Claims, 14 Drawing Sheets

TOOL STAND

BACKGROUND OF INVENTION

1. Field of Invention

The present invention relates to a tool stand and, more particularly, to a safe tool stand for easy storage and display of tools.

2. Related Prior Art

As disclosed in U.S. Pat. No. 7,699,413 and Taiwanese Patent Publication No. 554811, a conventional tool stand includes a cabinet supported on casters. Thus, the cabinet can be moved around on the casters. The cabinet includes several drawers movably supported thereon. The drawers are used to store various tools. It is, however, difficult if not impossible to know what tools are stored in which drawer since the drawers are substantially identical to one another. Therefore, the drawers have to be opened one after another so that the tools contained therein can be observed and a needed tool can be taken from the related drawer for use. This is obviously inconvenient and takes precious time.

As disclosed in German Patent Publication No. 20002747, another conventional tool stand includes a base 6, a post 5 supported on the base 6, trays 1 pivotally connected to the post 5, a box 2 pivotally connected to the post 5 below the trays 1, two large wheels 7 connected to the base 6, and two casters 8 connected to the box 2. In a closed mode, the trays 1 and the box 2 are located over one another. The trays 1 and the box 2 can be pivoted around the post 5 to an opened mode in which the trays 1 and the box 2 are not over one another. It is easy to observe tools stored in the trays 1 and the box 2 when they are in the opened mode. There is however risk of a user stumbling over the wheels 7, which are located beyond the box 2.

SUMMARY OF INVENTION

It is the primary objective of the present invention to provide a safe tool stand for easy storage and display of tools.

To achieve the foregoing objective, the tool stand includes a base, a post rotationally supported on the base, at least two trays rotationally supported on the post above the base, small wheels connected to the base, and large wheels connected to the lowermost one of trays so that the large wheels do not interfere with the rotation of the base relative to the post.

Other objectives, advantages and features of the present invention will be apparent from the following description referring to the attached drawings.

BRIEF DESCRIPTION OF DRAWINGS

The present invention will be described via detailed illustration of seven embodiments referring to the drawings wherein.

DETAILED DESCRIPTION OF EMBODIMENTS

Figure 1:
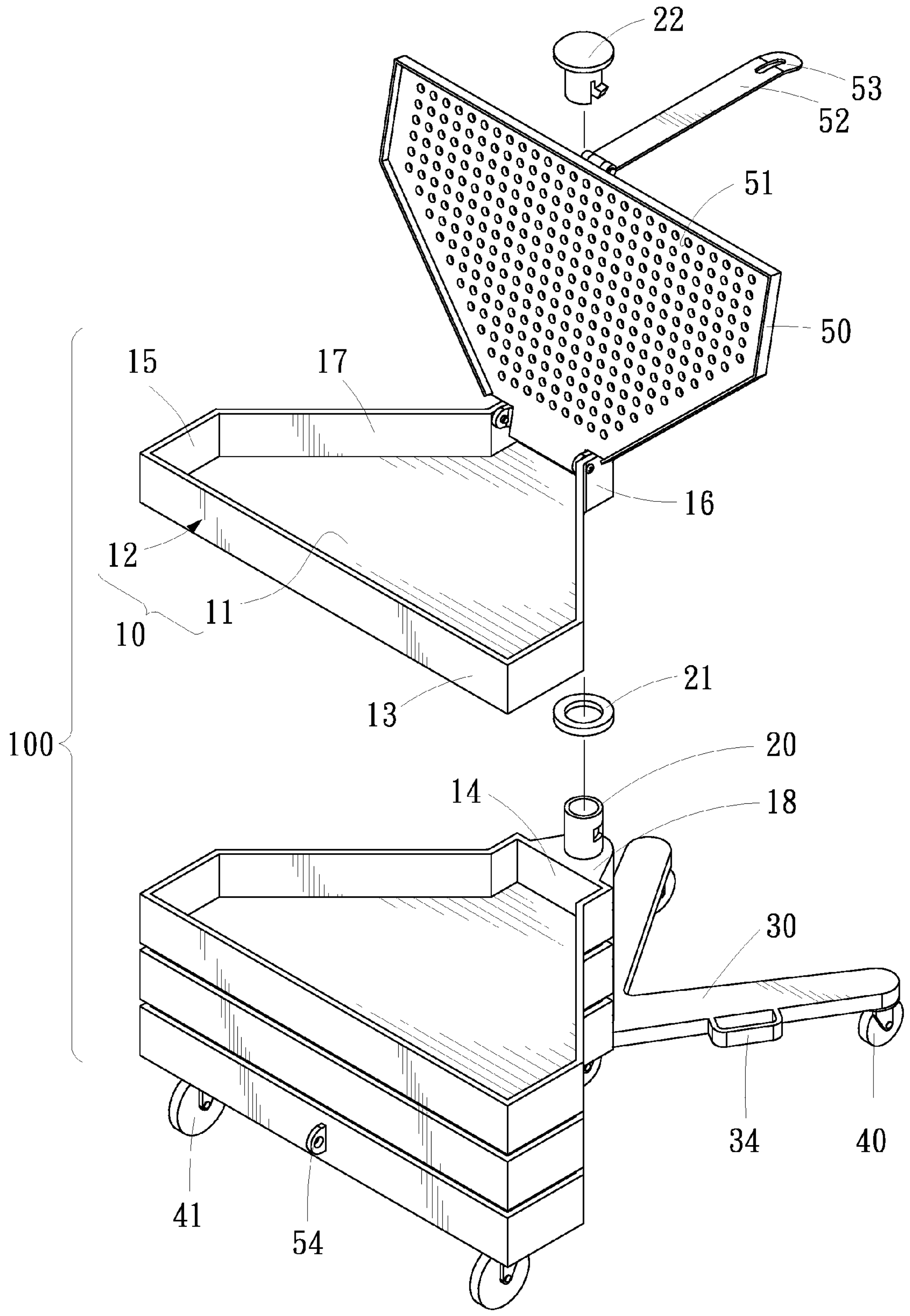
FIG. 1 is an exploded view of a tool stand according to the first embodiment of the present invention.

Referring to FIGS. 1 through 7, there is shown a tool stand 100 according to a first embodiment of the present invention. The tool stand 100 preferably includes four trays 10, a post 20, a base 30, three small wheels 40, two large wheels 41 and a lid 50.

The base 30 is a V-shaped element that includes two branches 31 extending from a hub 32. Each of the branches 31 is formed with a grip 34 operable to rotate the base 30. The hub 32 is an annular element. There is provided a bearing 33 to be described.

Figure 3:
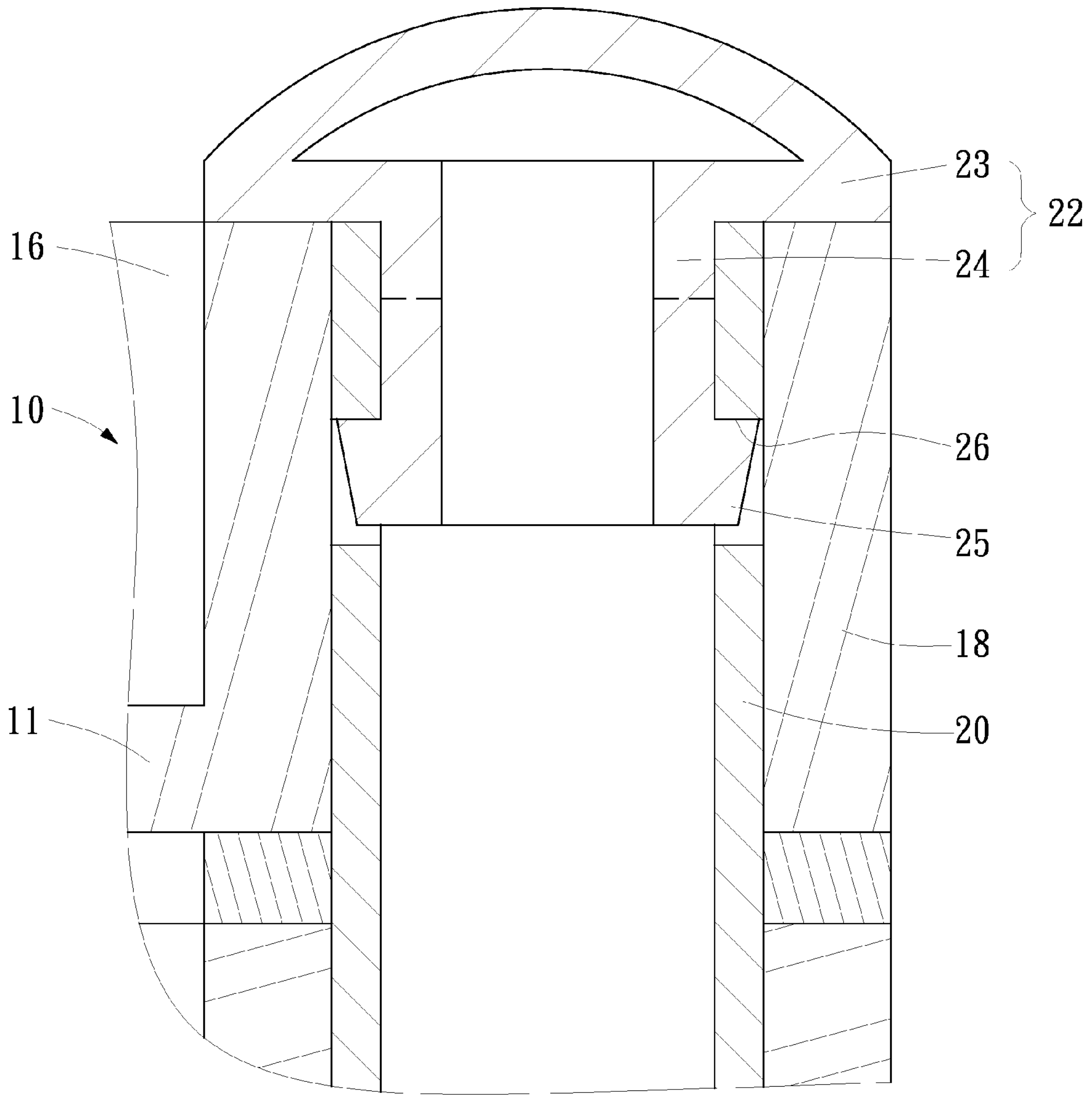
FIG. 3 is an enlarged, partial, cross-sectional view of the tool stand shown in FIG. 2.

As shown in FIG. 3, the post 20 includes two apertures 26 defined therein near an upper end thereof. There is provided a plug 22. The plug 22 includes a head 23 and a body 24. The diameter of the head 23 is longer than that of the body 24. The body 24 is a tubular element. The body 24 is formed with two barbs 25. Each of the barbs 25 is formed between two slits cut in the body 24 of the plug 22. Thus, the body 24 of the plug 22 includes two hook-like elements each formed with a barb 25. There are provided three washers 21 to be described.

Each of the trays 10 includes a floor 11, an enclosure 12 extending on the floor 11, and a lug 18 extending from the enclosure 12. The enclosure 12 includes a front wall 13, a rear wall 14, two long lateral walls 15, two short lateral walls 16 and two intermediate walls 17. The front wall 13 extends parallel to the rear wall 14. The long lateral walls 15 extend parallel to the short lateral walls 16. Each of the intermediate walls 17 extends to a related one of the short lateral walls 16 from a related one of the long lateral walls 15. The lateral intermediate walls 17 extend along two lines that intersect each other at the rear wall 14. The lug 18 is located against the rear wall 14.

The diameter of the small wheels 40 is shorter than that of the large wheels 41 for reasons to be given.

The lid 50 is shaped corresponding to the trays 10. The lid 50 includes apertures 51 defined therein.

There is provided a locking unit. The locking unit includes a tab 52 pivotally connected to the lid 50 and an ear 54 formed on the front wall 13 of the lowermost one of the trays 10. The tab 52 includes a slot 53 defined therein.

Figure 4:
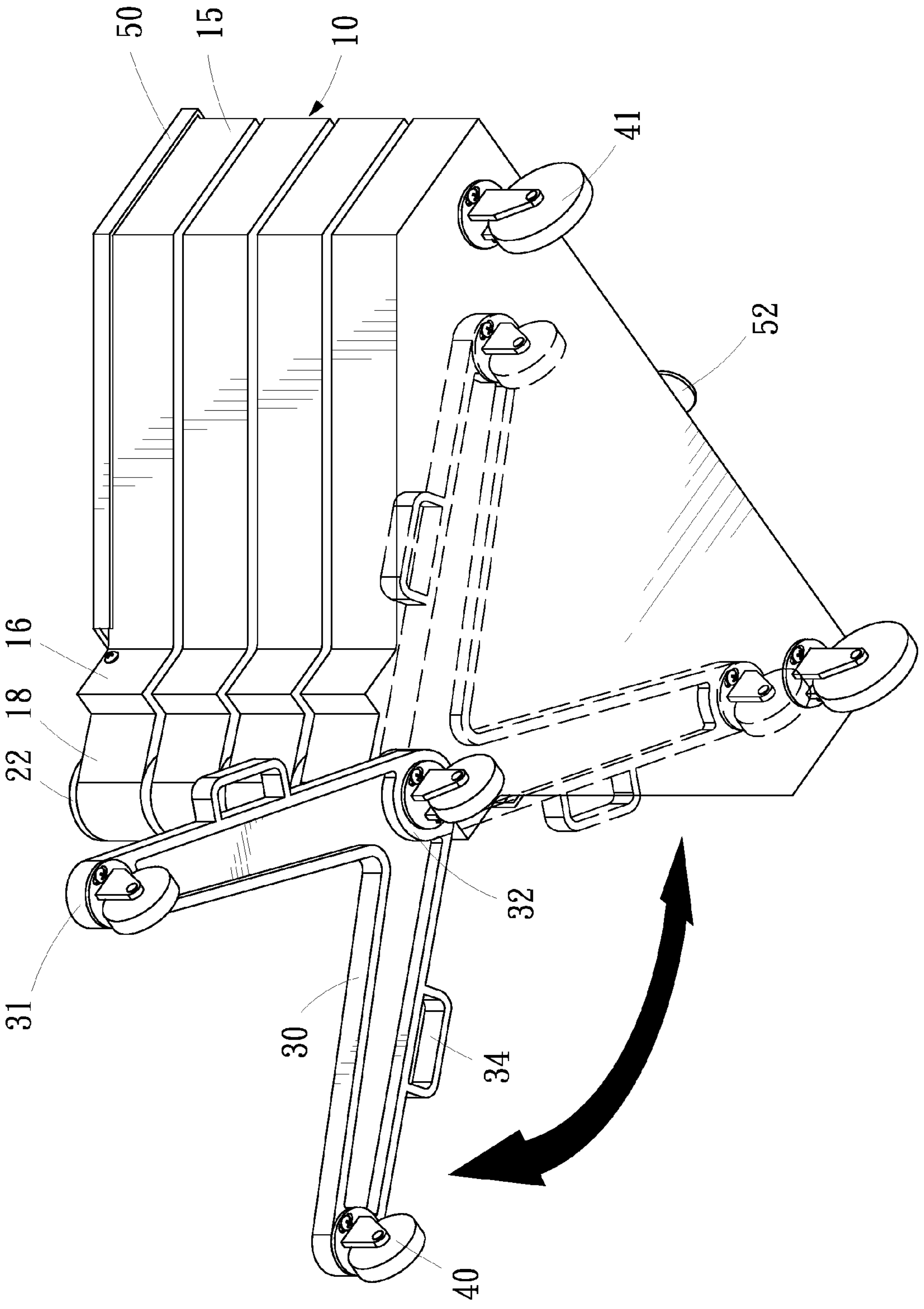
FIG. 4 is another perspective view of the tool stand shown in FIG. 1.

Referring to FIG. 4, one of the small wheels 40 is connected to one of the branches 31 of the base 30. Another one of the small wheels 40 is connected to the other branch 31 of the base 30. The other small wheel 40 is connected to the hub 32 of the base 30.

Figure 5:
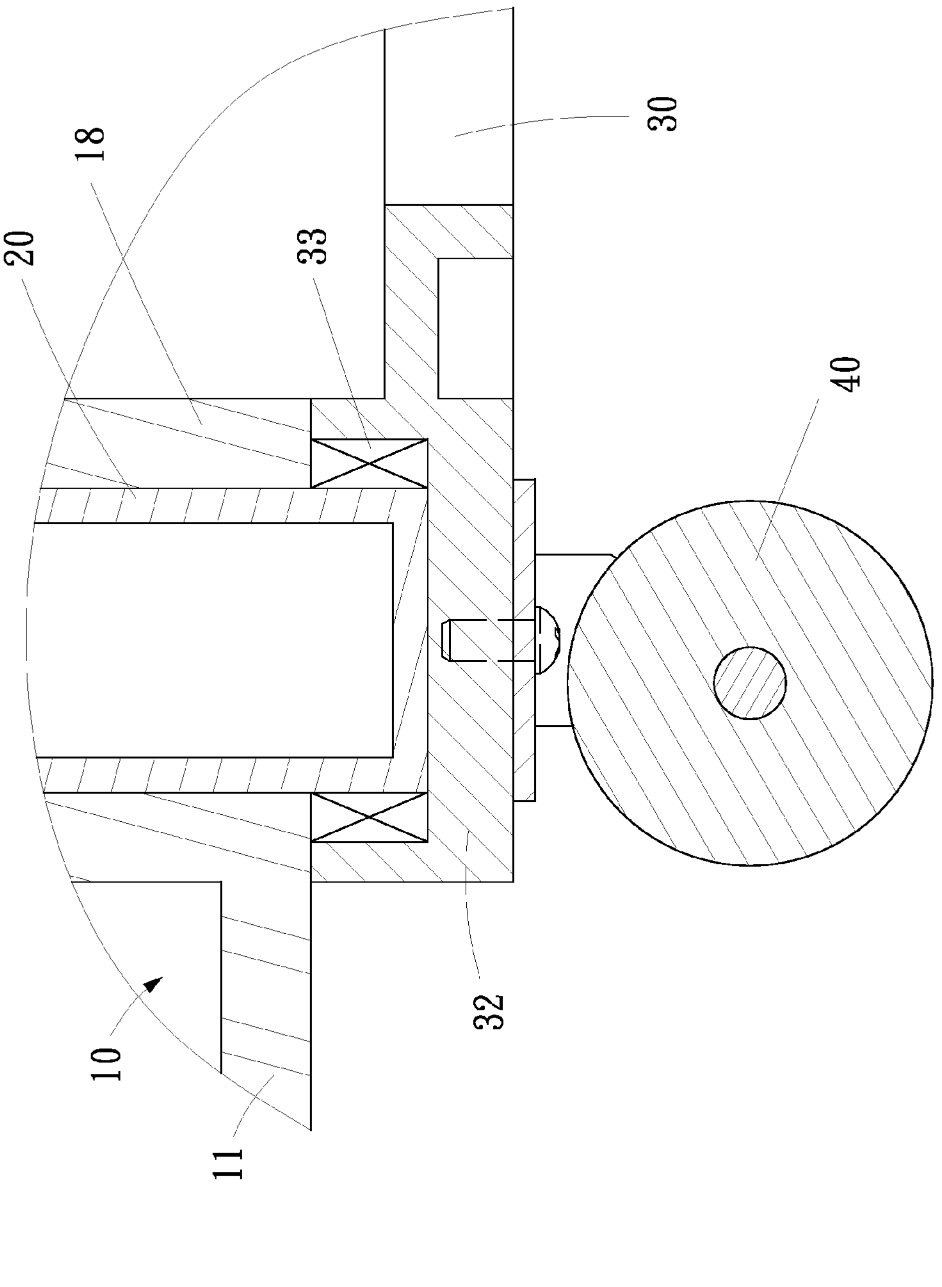
FIG. 5 is another enlarged, partial, cross-sectional view of the tool stand shown in FIG. 2.

Referring to FIG. 5, the bearing 33 is fit in the hub 32 of the base 30. A lower end of the post 20 is fit in the bearing 33.

Thus, the post 20 cannot be moved from the base 30 axially but they can be rotated relative to each other.

Referring to FIG. 4, the large wheels 41 are connected to the lowermost tray 10. Each of the washers 21 is sandwiched between the lugs 18 of two adjacent ones of the trays 10, i.e., the washers 21 and the lugs 18 of the trays 10 are alternately arranged. The washers 21 are used to prevent the trays 10 from being stuck on one another.

Referring to FIG. 3, the body 24 of the plug 22 is inserted in the upper end of the post 20 so that the barbs 25 are trapped in the apertures 26 of the post 20. A diameter of the head 23 of the plug 22 is shorter than an external diameter of the post 20 and an internal diameter of the lug 18 of each of the trays 10 so that the trays 10 cannot be removed from the post 20 past the head 23 of the plug 22. Furthermore, an external diameter of the post 20 is marginally shorter than an internal diameter of the lug 18 of each of the trays 10 so that the trays 10 can smoothly be rotated around the post 20.

Referring to FIG. 1, the lid 50 is pivotally connected to the short lateral walls 16 of the uppermost one of the trays 10 by two screws, rivets, pins or the like. The tab 52 is pivotally connected to the lid 50 by a hinge for example.

Figure 2:
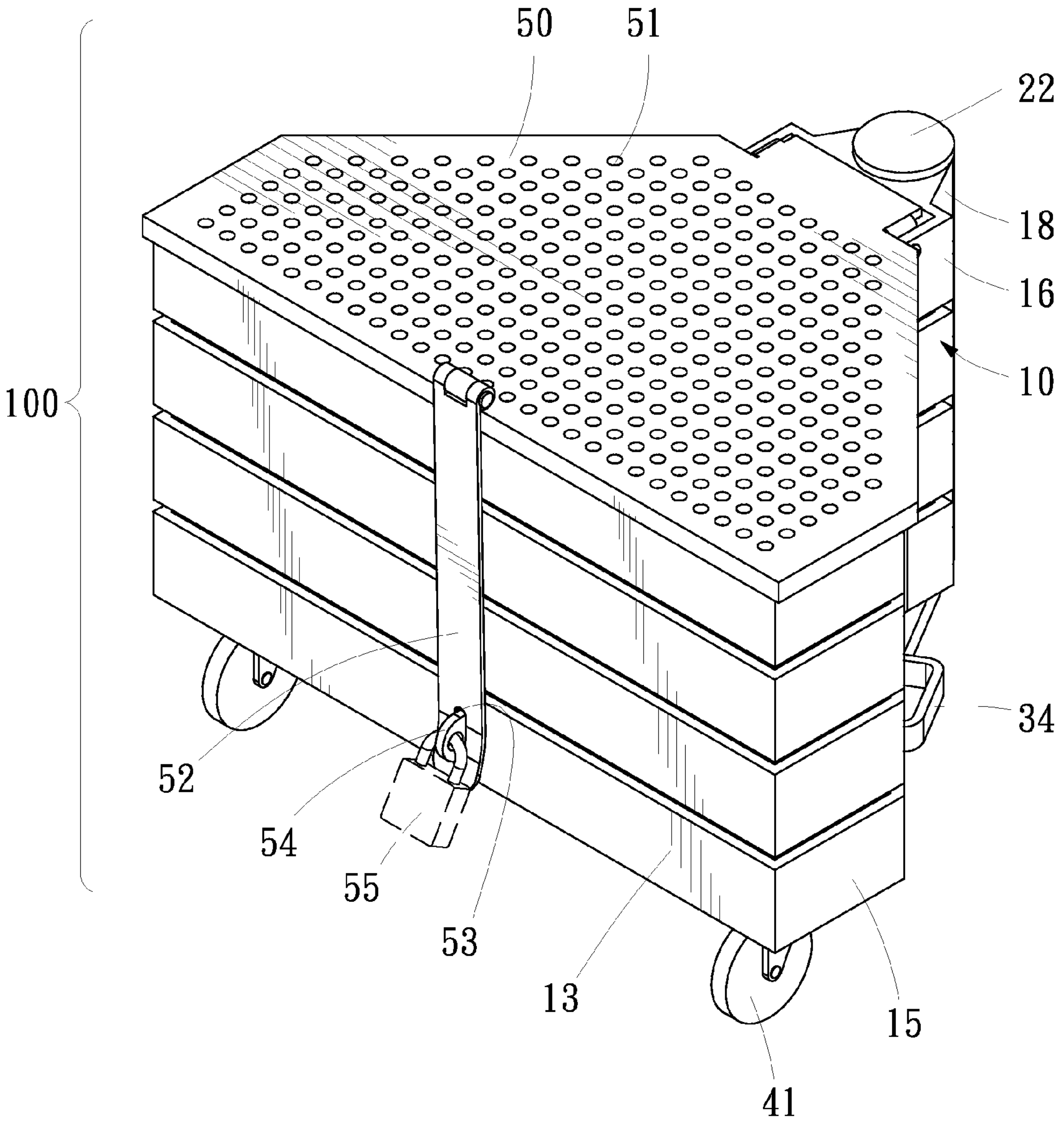
FIG. 2 is a perspective view of the tool stand shown in FIG. 1.

Referring to FIG. 2, the tab 52 is lowered and located against the front walls 13 of the trays 10. The lug 54 is inserted through the slot 53 defined in the tab 52. The tab 52 is lucked to the lug 54 by a pad lock 55 for example. Thus, the lid 50 is locked to the trays 10. Moreover, the trays 10 cannot be rotated relative to one another. Hence, the trays 10 are kept over one another. That is, the trays 10 are kept in a locked mode.

Figure 6:
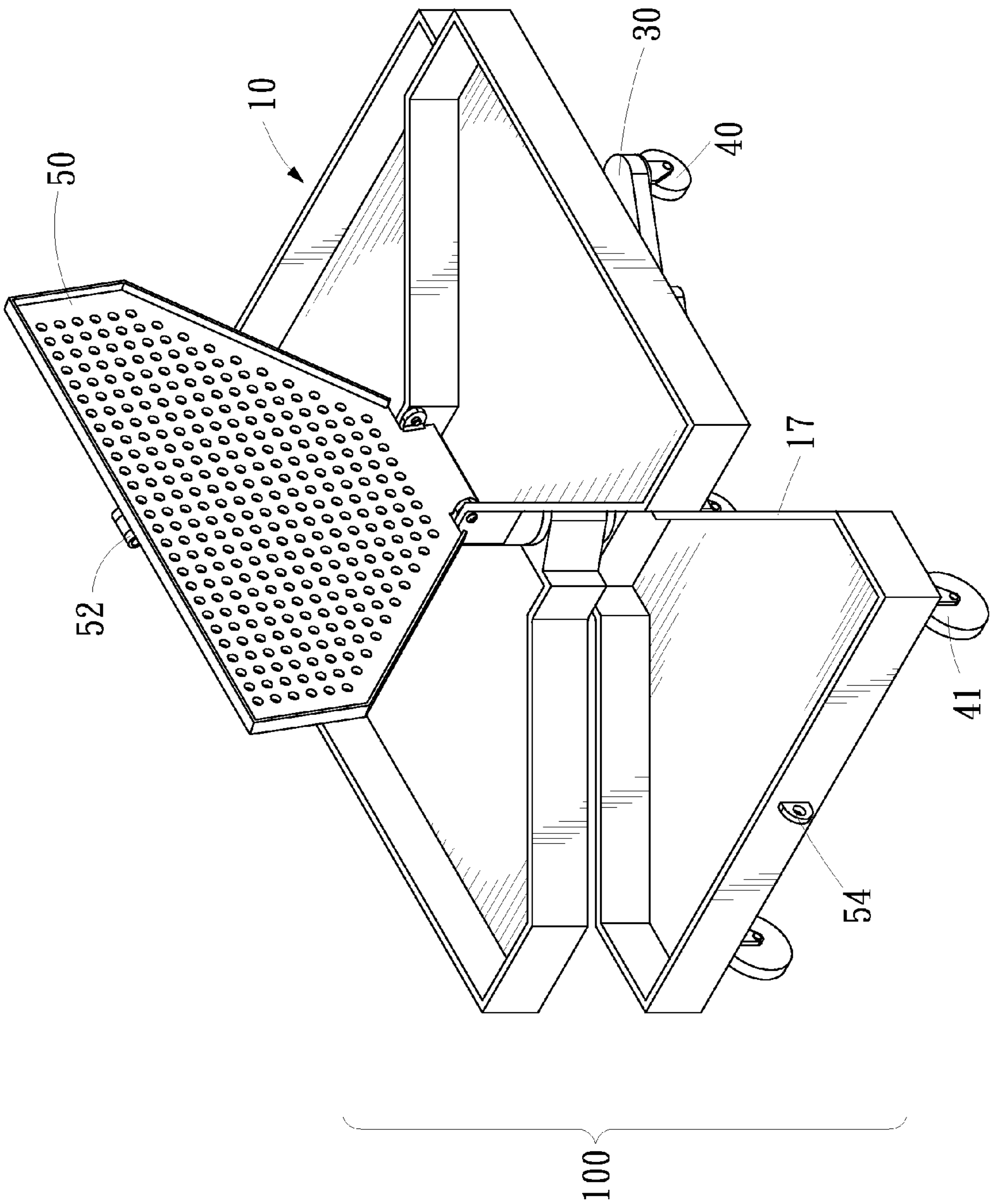
FIG. 6 is a perspective view of the tool stand in an opened mode other than the closed mode shown in FIG. 2.
Figure 7:
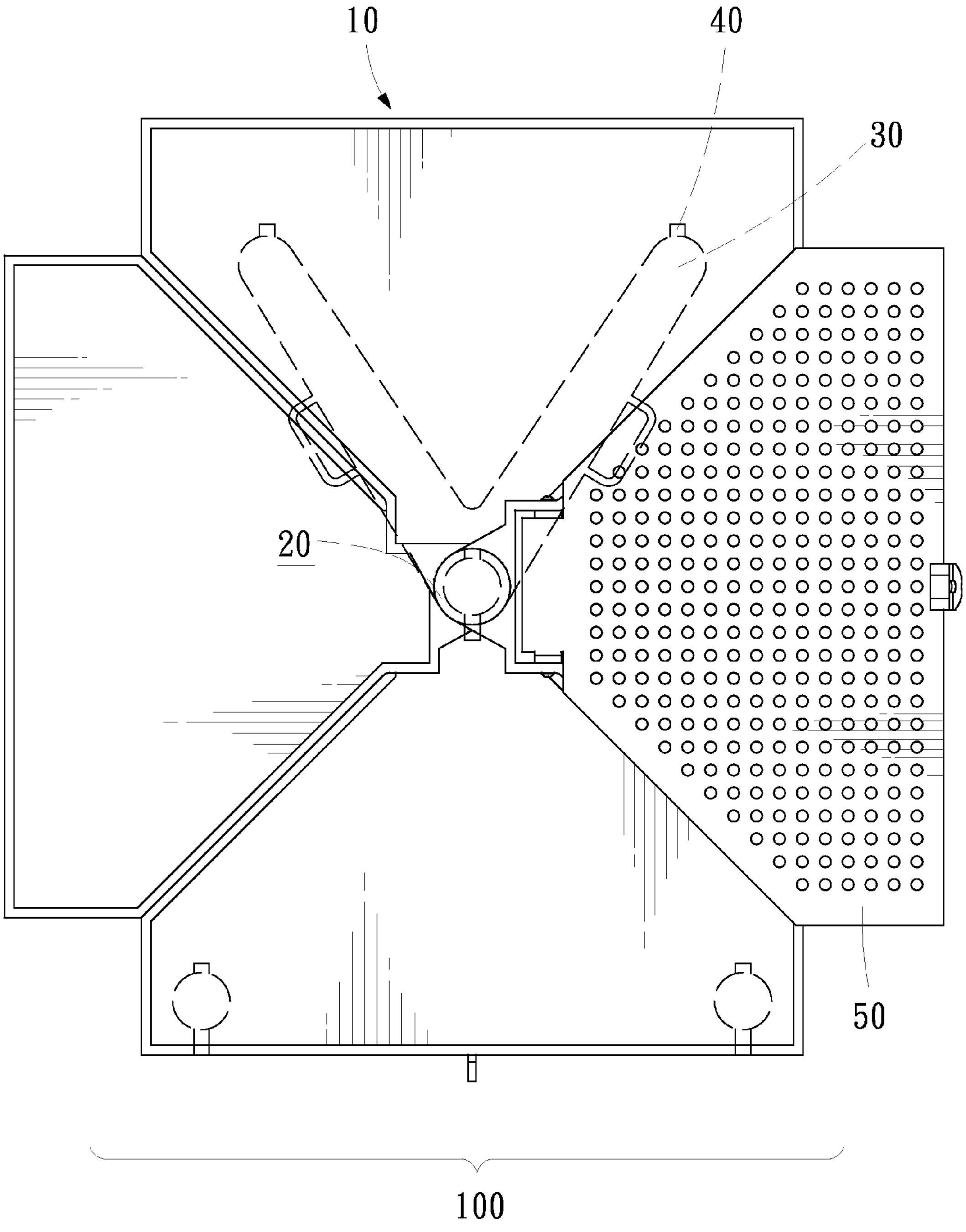
FIG. 7 is a top view of the tool stand shown in FIG. 6.

Referring to FIGS. 6 and 7, the tab 52 is released from the lug 54. The tab 52 is lifted from the front walls 13 of the trays 10. The lid 50 is lifted from the uppermost tray 10. Moreover, the trays 10 are rotated relative to one another so that they are not located over one another. That is, the trays 10 are located in an opened mode.

Referring to FIG. 4, the base 30 can be pivoted to a position relative to the lowermost tray 10 so that the base 30 is located beyond the lowermost tray 10 as shown by solid lines. Thus, the wheels 40 and 41 occupy a large area to support the trays 10 firmly particularly when the trays 10 are in the opened mode. It should be noted that the large wheels 40 do not interfere with the rotation of the base 30.

On the other hand, the base 30 can be pivoted to another position relative to the lowermost tray 10 so that the base 30 is located within the lowermost tray 10 as shown by phantom lines. Thus, there is little risk of a person stumbling over the base 30.

The diameter of the small wheels 40 is shorter than that of the large wheels 41 to compensate the difference between the elevation of the bottom of the base 30 and the elevation of the bottom of the lowermost tray 10. Thus, the trays 10 are located horizontally as the wheels 40 and 41 are located on a floor or the ground.

Figure 8:
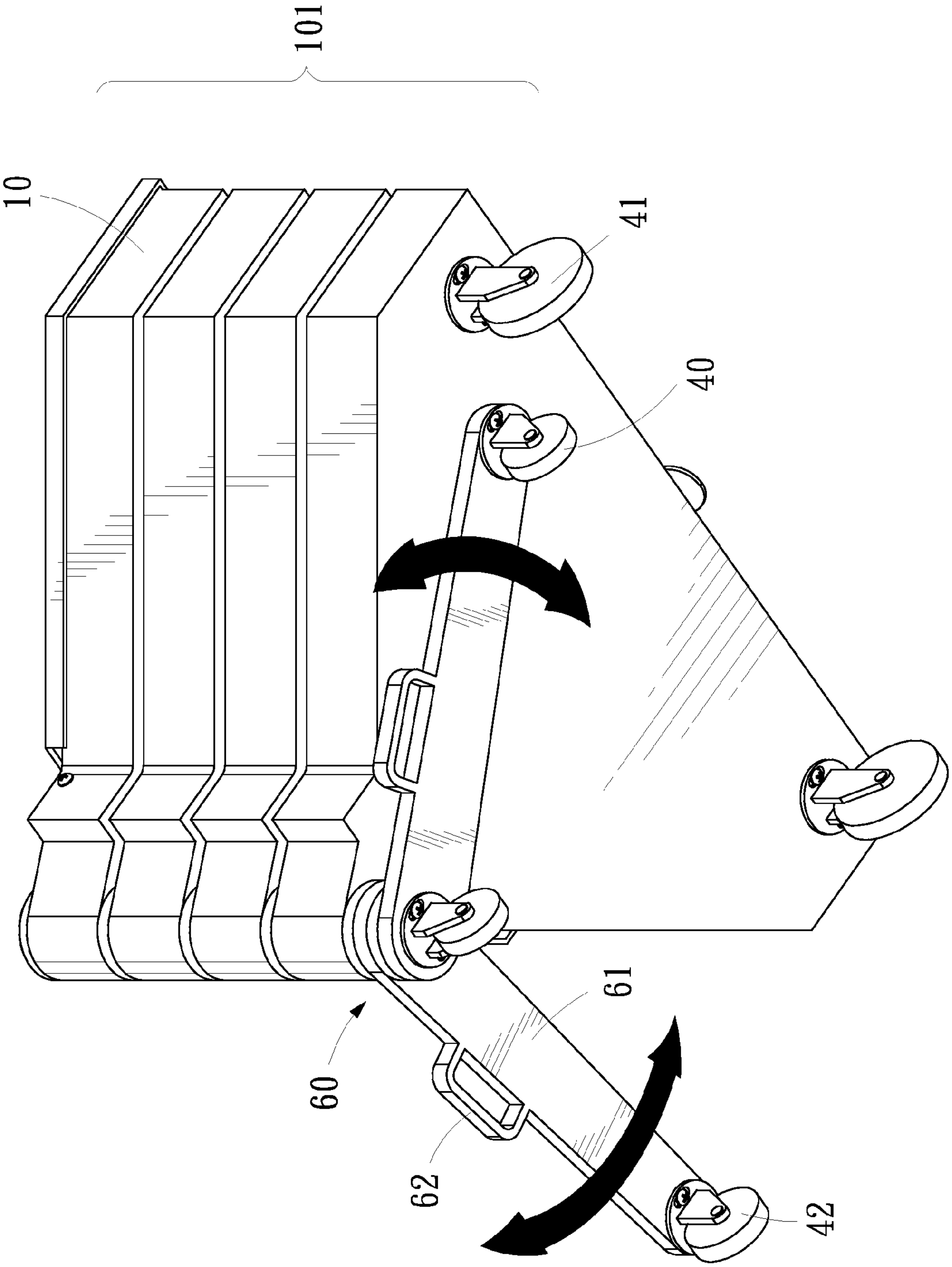
FIG. 8 is a perspective view of a tool stand according to the second embodiment of the present invention.
Figure 9:
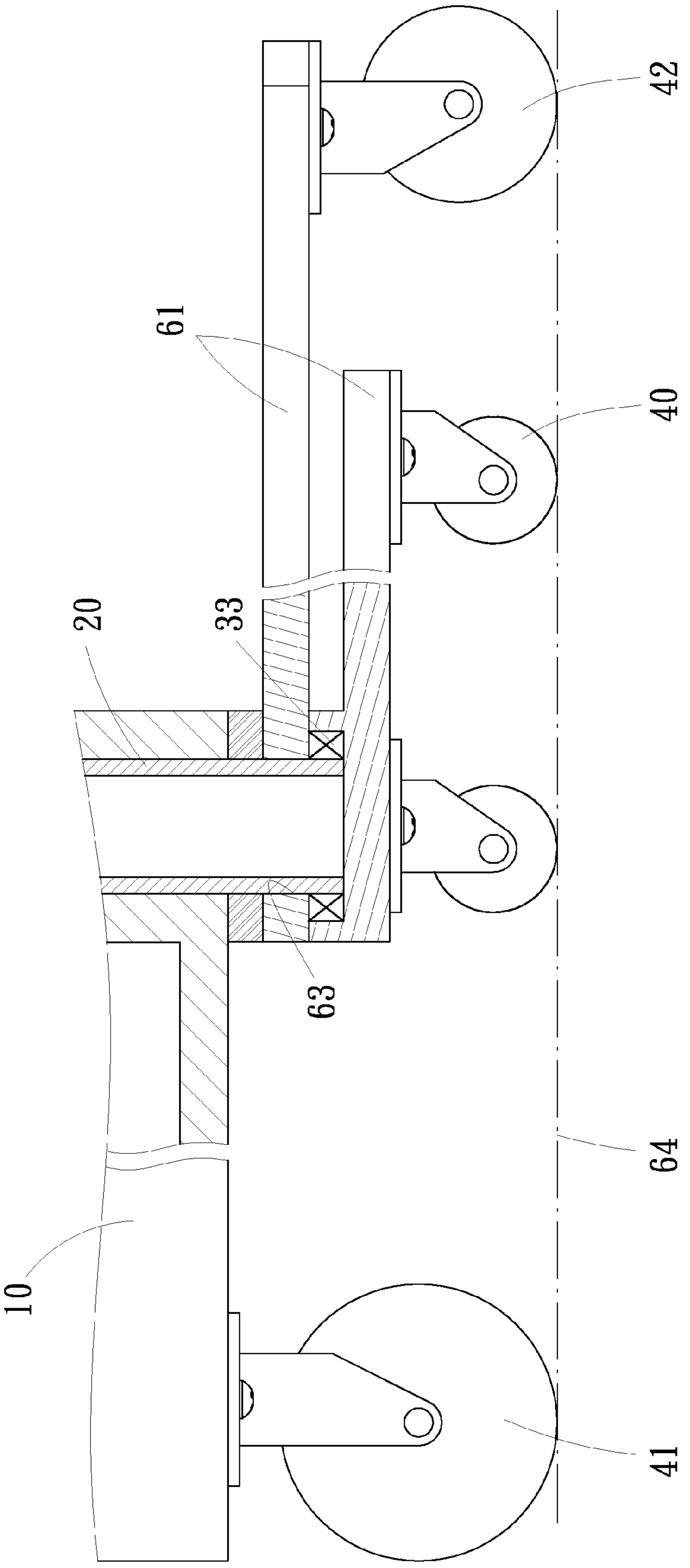
FIG. 9 is an enlarged, partial, cross-sectional view of the tool stand shown in FIG. 8.

Referring to FIGS. 8 and 9, there is shown a tool stand 101 according to a second embodiment of the present invention. The tool stand 101 is identical to the tool stand 100 except two things. Firstly, there is used a base 60 instead of the base 30. The base 60 includes a lower bar 61 and an upper bar 61. The lower and upper bars 61 are made separately. Each of the lower and upper bars 61 is formed with a grip 62. Both of the lower and upper bars 61 are pivotally connected to the post 20. Secondly, two small wheels 40 are connected to the lower bar 61 while another medium wheel 42 is attached to the upper bar 61.

As shown in FIG. 8, the diameter of the medium wheel 42 is longer than that of the small wheels 40 to compensate the difference between the elevation of the bottom of the upper bar 61 and the elevation of the bottom of the lower bar 61. The diameter of the medium wheel 42 is shorter than that of the large wheels 41 to compensate the difference between the elevation of the bottom of the upper bar 61 and the elevation of the bottom of the lowermost tray 10. Thus, the trays 10 are located horizontally as the wheels 40, 41 and 42 are located on a floor or the ground.

Figure 10:
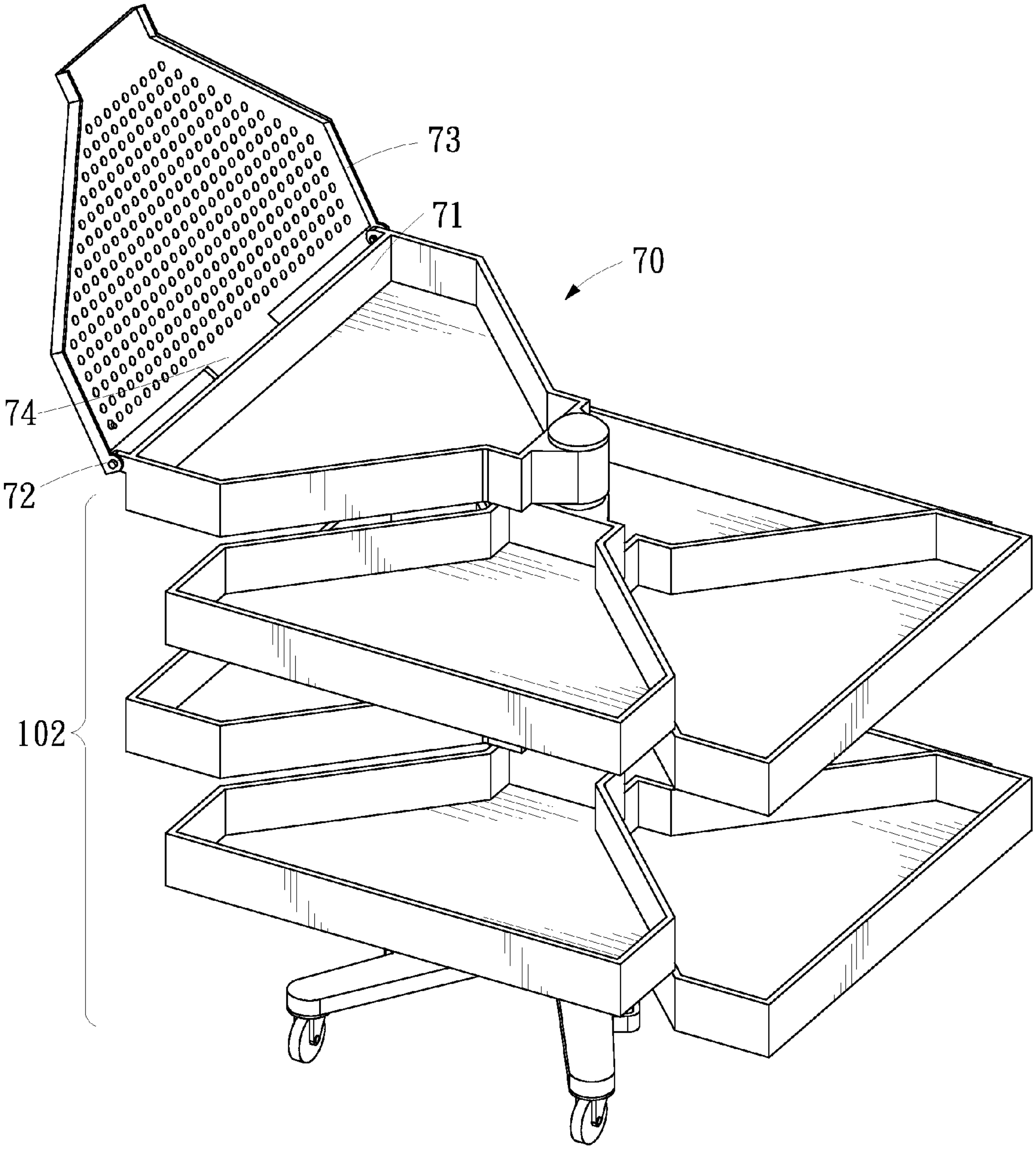
FIG. 10 is a perspective view of a tool stand according to the third embodiment of the present invention.

Referring to FIG. 10, there is shown a tool stand 102 according to a third embodiment of the present invention. The tool stand 102 is identical to the tool stand 100 except two things. At first, there are eight trays instead of the four trays 10. The eight trays include a tray 70 and seven trays 10. The tray 70 is identical to the trays 10 except including two ears 72 extending from a front wall 71. Secondly, there is a lid 73 pivotally connected to the ears 72.

Figure 11:
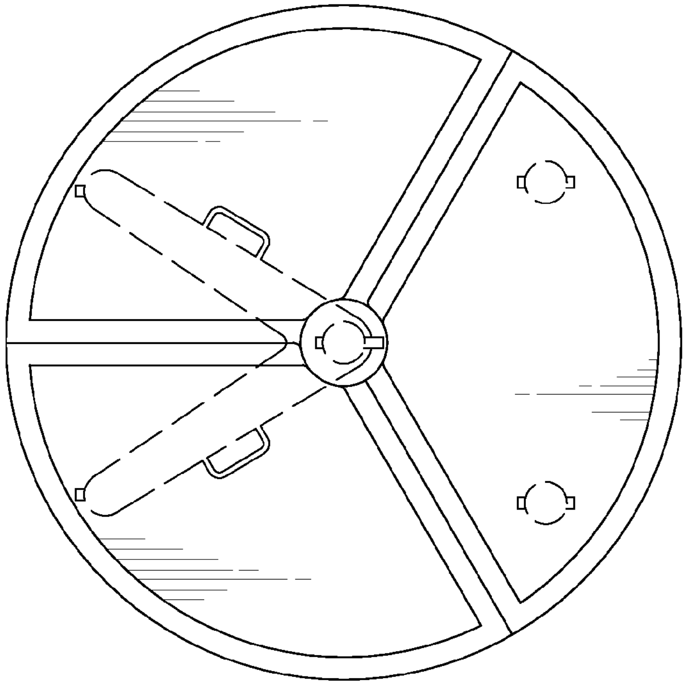
FIG. 11 is a top view of a tool stand according to the fourth embodiment of the present invention.

Referring to FIG. 11, there is shown a tool stand according to a fourth embodiment of the present invention. The fourth embodiment is identical to the first embodiment except including three sector-shaped trays instead of the trays 10.

Figure 12:
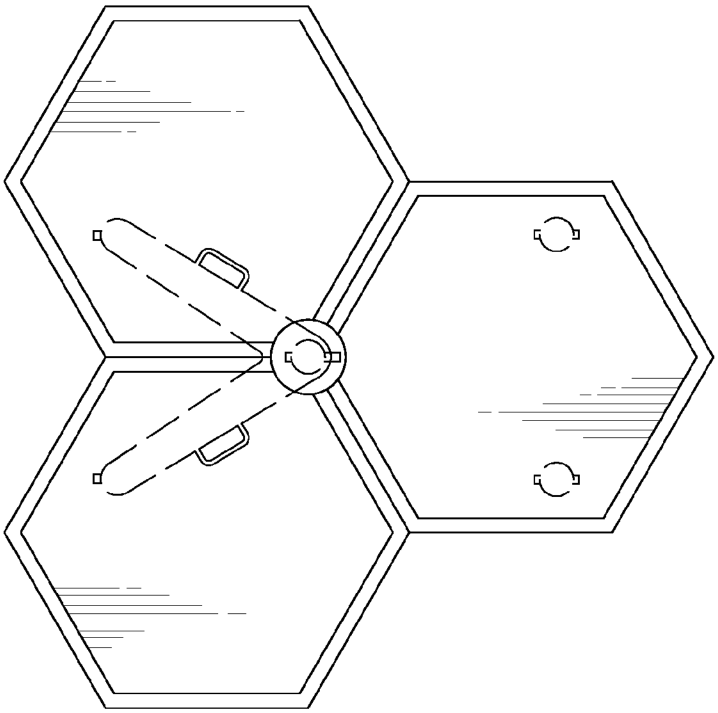
FIG. 12 is a top view of a tool stand according to the fifth embodiment of the present invention.

Referring to FIG. 12, there is shown a tool stand according to a fifth embodiment of the present invention. The fourth embodiment is identical to the first embodiment except including three hexagonal trays instead of the trays 10.

Figure 13:
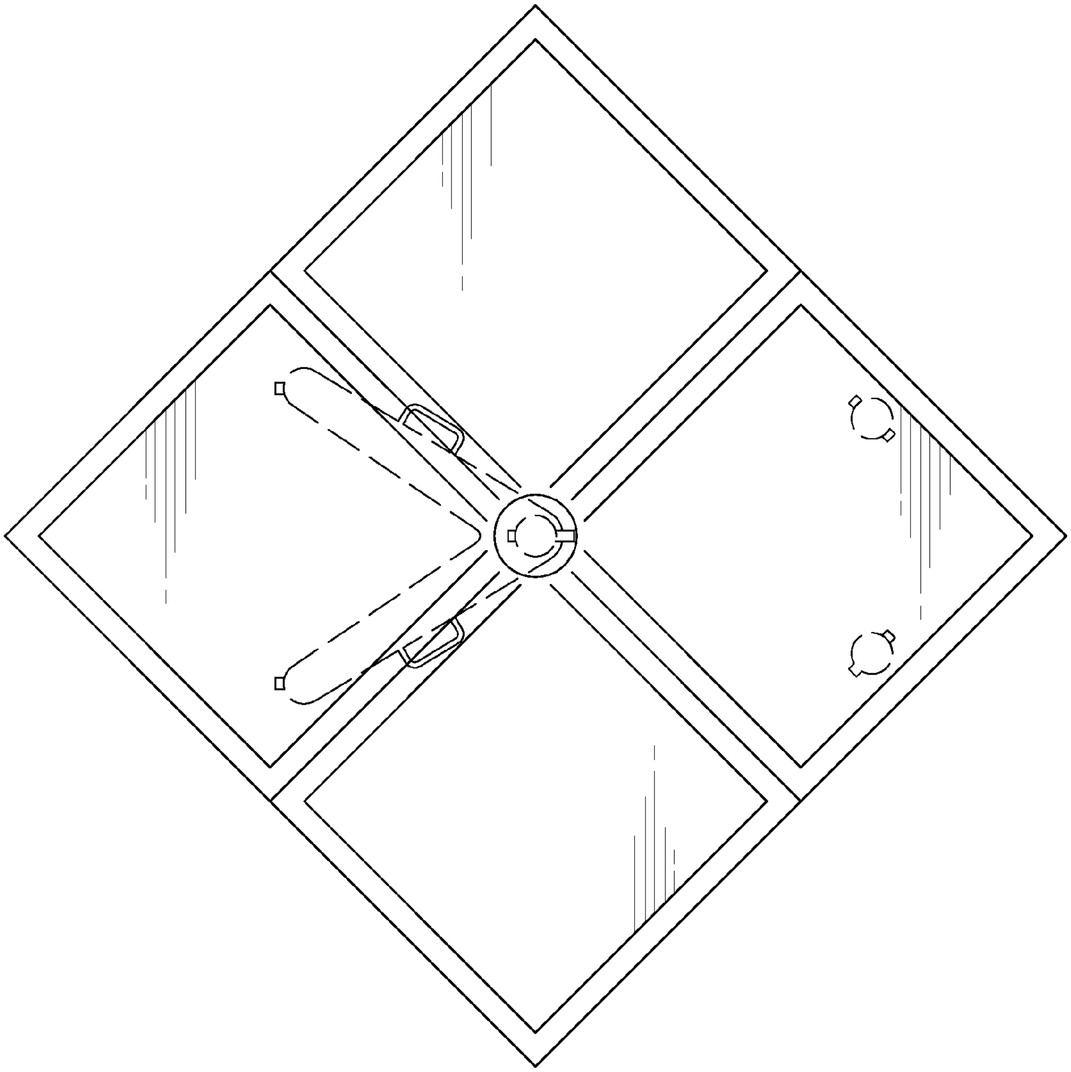
FIG. 13 is a top view of a tool stand according to the sixth embodiment of the present invention.

Referring to FIG. 13, there is shown a tool stand according to a sixth embodiment of the present invention. The sixth embodiment is identical to the first embodiment except including four square trays instead of the trays 10.

Figure 14:
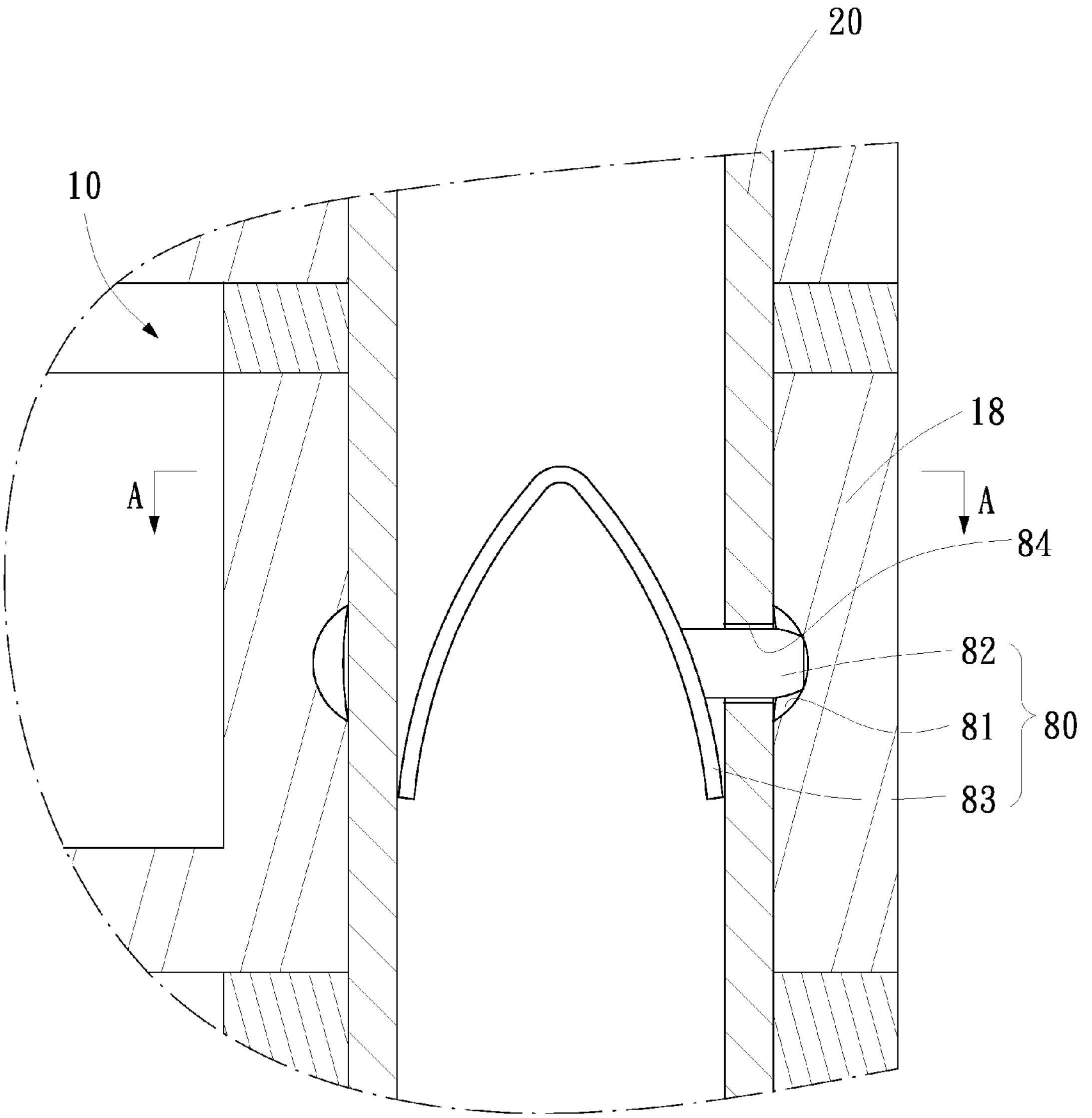
FIG. 14 is an enlarged, partial, cross-sectional view of a tool stand according to the seventh embodiment of the present invention.
Figure 15:
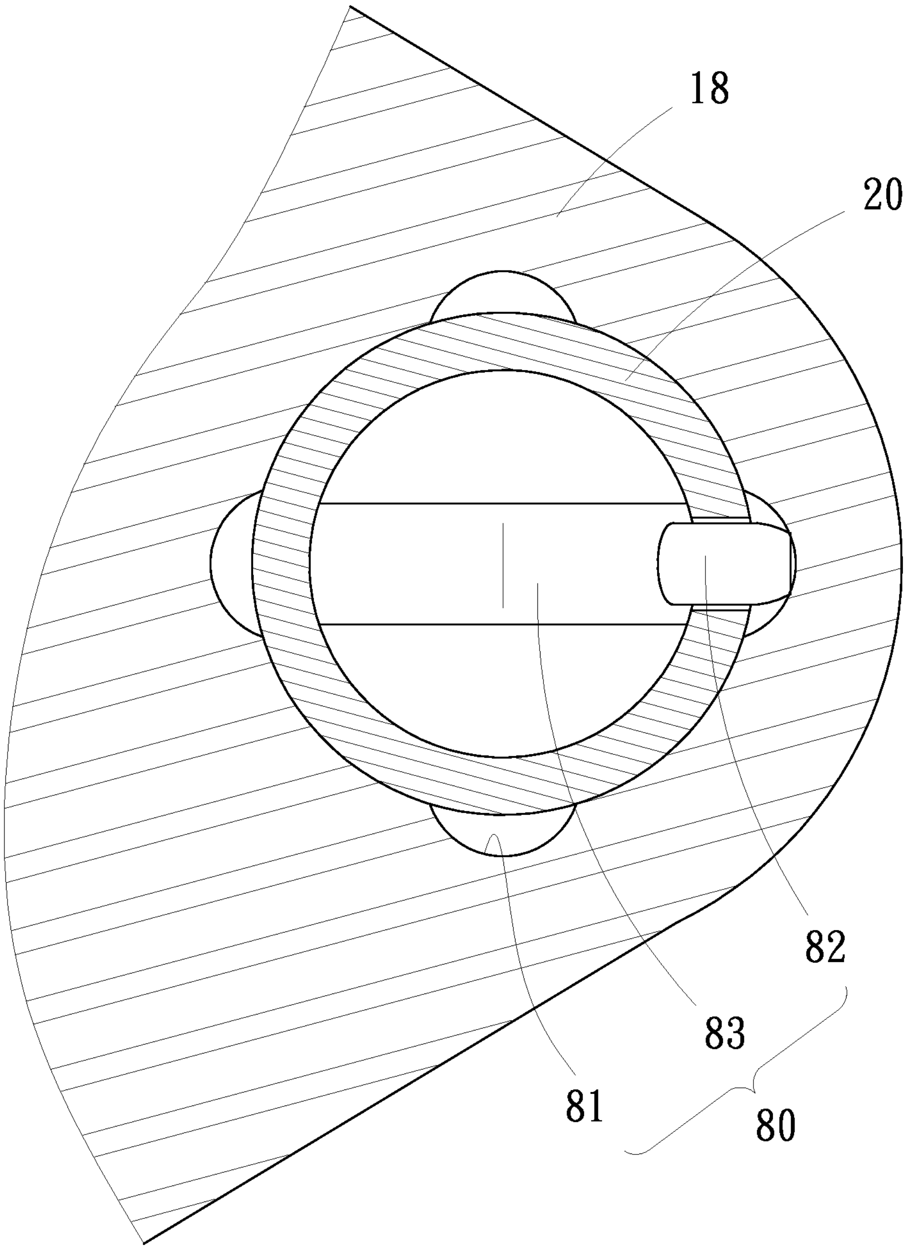
FIG. 15 is an enlarged, partial, cross-sectional view of the tool stand taken along a line A-A shown in FIG. 14.

Referring to FIGS. 14 and 15, there is shown a tool stand according to a seventh embodiment of the present invention. The seventh embodiment is identical to the first embodiment except including a positioning unit 80 for each of the trays 10. The positioning unit 80 includes a detent 82 formed on one of two branches of a V-shaped leaf spring 83. The detent 82 is inserted through an aperture 84 (also referred to as a "hole") defined in the post 20. The tip of the detent 82 can be inserted in a selected one of four recesses 81 defined in an internal side of the lug 18 to retain the related tray 10 in a selected one of four angles relative to the post 20. The tip of the detent 82 can be removed from the recess 81 to allow rotation of the related tray 10 to another one of the angles relative to the post 20 since the recesses 81 are shaped in compliance with a portion of a sphere while the tip of the detent 82 is chamfered.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A tool stand including:

a base including a hub and two branches extending from the hub;

a bearing placed in the hub;

a post including a lower end inserted in the bearing, an upper end, and apertures defined near the upper end;

at least an upper tray and a lower tray rotationally supported on the post above the base, wherein the upper tray can be rotated on the post independent of the lower tray;

a plug including a head placed against the upper end of the post, a body inserted in the post, and two barbs inserted in the apertures of the post so that the upper and lower trays are kept on the post by the plug;

a small wheel connected to the hub and two more small wheels each connected to a corresponding one of the branches; and large wheels connected to the lower tray so that the large wheels do not interfere with the rotation of the base relative to the post.

2. The tool stand according to claim 1, wherein the trays are in a shape selected from the group consisting of a triangle, a square, a pentagon, a hexagon, a 180-degree sector, a 120-degree sector and a 90-degree sector.

3. The tool stand according to claim 1, including a lid pivotally connected to the upper tray.

4. The tool stand according to claim 1, including at least two positioning units each for elastically retaining one of the trays in a selected one of predetermined angles relative to the post.

5. The tool stand according to claim 4, wherein each of the trays includes at least two recesses defined therein, wherein each of the positioning units includes:

a detent for insertion in a selected one of the recesses through a hole defined in the post; and a spring including an end connected to the detent and another end connected to the post.

6. The tool stand according to claim 5, wherein the recesses are shaped in compliance with a portion of a sphere.

* * * * *